Patented Apr. 18, 1950

2,504,788

UNITED STATES PATENT OFFICE 2,504,788

FEED FORMULA

Walter Baker, White Hall, Oreg.

No Drawing. Application October 23, 1946,
Serial No. 705,243

1 Claim. (Cl. 99—4)

This invention relates to a properly balanced feed and more particularly to a feed for chickens and domestic animals that depend on grain and mineral mixture as a substantial portion of their diet.

Two of the most important factors in chicken raising are the health of chickens and the closely related quantity and quality of egg production. Numerous experiments and observations conducted over a period of years in developing the feed of this invention disclose that the great majority of diseases or factors relating to the health of chickens and quantity and quality of egg production result from improper food. In this connection, these experiments and observations disclosed that a diarrhea, known to poultrymen as "vent gleat," was the most prevalent factor in retarding development of healthy, long-life chickens and in reducing egg production and quality. These experiments also showed that this disease was rapidly produced by excessive feedings of bone meal and that the responsible element was an excess of phosphorus in the bone meal.

Further study showed that a proper balance between the elements calcium and phosphorus, namely about 2 parts calcium to 1 part phosphorus, was necessary to grow healthy chickens and obtain a maximum production of eggs of good quality. Attempts to obtain this desired balance by proper control of the quantities of these elements in the feed alone was found not to be the answer since assimilation of the calcium, controlled by the parathyroid gland, varied depending upon the thyroid secretion of iodine which usually was deficient and resulted in nonassimilation of the required amount of calcium and an unbalance in the assimilated calcium and phosphorus. While the deficiency, viewed in terms of volume, is quite small, trifling variations have extremely important effects on the function of the glands and health of the chickens.

By these experiments it was found that by increasing the iodine content of baby chicken feed above that generally recommended, the baby chickens at ten days were as large as the average chicken three weeks old and that both body and feather growth were increased.

It was also found that addition of iodine to the laying mash resulted in hens which were healthier and laid better for a longer period. Furthermore, these experiments have definitely shown that this optimum amount of iodine also resulted in increased egg shell density and thickness due to the ability of the chicken to assimilate greater quantities of the calcium bearing ingredients. As a matter of fact, eggs produced by chickens which were fed on the improved feed of this invention, resulted in shells having a density of a dish when viewed under the microscope and that contraction and expansion under heat and cold never forced moisture, bacteria or air in or out of the egg. As a consequence, such eggs were found to keep in perfect condition without refrigeration for at least seven months, the whites being still thick and clinging around the yolk like new laid eggs. Furthermore, the shells were free from cracks due to handling, even withstanding the weight of a person when stepped upon in a bed of straw. The fertility of the eggs was also retained. This occurred in spite of the fact that the eggs were not coated with the customary dressings, such as grease or paraffine, to seal the pores in the shell. One batch of seventeen eggs even laid in an exposed nest in a field and were found to be in good condition when found several months later although the shells were stained by exposure.

The next important ingredient which is an essential part of the improved mash of this invention is yeast. This has proven beneficial to chickens afflicted with the disease known as "coccidiosis" which impairs the bird's ability to digest and eliminate its food causing poor health and a lower market value or in many cases resulting in the death of the chicken.

Chickens having coccidiosis were placed in a fattening coop and fed on a yeasted fattening mash for three weeks. These chickens except for a small percentage improved in health and increased their weight to that of normal healthy chickens thereby turning what would generally be a complete loss into a profit. The rate of increase in the weight of normal chickens under similar conditions was much greater than that of chickens fed on the usual fattening mash which causes indigestion when fed more than a week or ten days.

The use of anise oil also plays an important part in my feed formula. This sweet oil makes the feed more palatable to the chickens and they eat much more of it than of feed not containing anise oil. A small amount of salt also enhances the flavor of this feed for the chicken. The small quantities of copperas, manganese and dried sulphate of iron are beneficial to the blood; and mineral oil, aside from its general healthful qualities, has proven of great value in coating the exposed surfaces of cracked grain to seal the surfaces and check oxidation of the grain.

It, accordingly is a primary object of this invention to produce a poultry or like feed in which the percentage proportions of calcium and phosphorus are controlled to a ratio of at least 2 to 1 and having an iodine content sufficient to assure assimilation of these elements in this ratio.

A further important object of this invention is to provide a balanced poultry or like feed including calcium, phosphorus, yeast, iodine and mineral oil to provide a feed that will assure assimilation of calcium and phosphorus in optimum balance and that will keep without fermentation or oxidation of the grain for a maximum length of time.

Another object of this invention is to blend the constituents of a poultry or like feed to assure an adequate supply of calcium, phosphorus and iodine for proper assimilation.

Still another object of this invention is to provide a feed containing an adequate supply of calcium, phosphorus and iodine for proper assimilation and modifying the other ingredients to furnish a baby chicken mash, or a breeder mash or an egg mash as may be desired.

Still further objects will appear from the appended claim and following description, which discloses a poultry or like feed embodying the teachings of this invention.

While the relative percentage composition may from time to time vary depending upon the food value of the specific ingredients, it is to be understood that variations in combining weights of the ingredients may be made to secure the beneficial proportioning or composition and that such variations are intended to come within the scope of the appended claims.

A feed having the desirable characteristics of this invention may be produced by combining the following ingredients by weight as shown by the table below:

The parts by weight composition of these ingredients which has been found to be desirable is as follows:

| Ingredient | Fiber | Ash | Calcium | Phosphorus | Protein | Carbohydrate | Fat |
|---|---|---|---|---|---|---|---|
| Ground wheat | 3.6 to 7.2 | 3.6 to 7.2 | 0.1 to 0.2 | 0.746 to 1.492 | 23.8 to 47.6 | 143.8 to 287.6 | 4.2 to 8.4 |
| Ground corn | 7.6 to 12.35 | 6 to 9.75 | 0.084 to 0.078 | 1.04 to 1.658 | 41.6 to 67.60 | 281.2 to 456.65 | 20 to 32.5 |
| Oat groat | 5 | 6 | 0.086 | 0.946 | 23.6 | 119.4 | 10.0 |
| Millrun | 32 to 40 | 19.2 to 24 | 4 to 5 | 3.552 to 4.440 | 38.40 to 48.0 | 114.32 to 180.4 | 9.6 to 12 |
| Dehydrated alfalfa | 18 to 36 | 12 to 24 | 2.08 to 4.16 | 0.44 to 0.88 | 20 to 40 | 36 to 72 | 4 to 8 |
| Meat and bone meal | 3 to 6 | 30 to 60 | 10.35 to 20.7 | 5.1 to 10.2 | 50 to 100 | | 10 to 20 |
| Herring meal | 2 to 3.5 | 20 to 35 | 6.9 to 12.075 | 3.48 to 5.95 | 70 to 122.5 | | 3 to 5.25 |
| Dried whey [1] (lacto G) | | 8.4 to 10.5 | 1.603 to 3.622 | 1.175 to 1.786 | 13.3 to 38.4 | 0 to 68.2 | 0.4 to 0.9 |
| "Sunshine" minerals [2] | | 47.50 | 22 | 4 | | | |
| "Nopco" brand cod liver oil [3] | | | | | | | 0.5 to 10.00 |
| Yeast | 0.19 to 0.38 | 0.121 to 0.242 | 0.001 to 0.002 | 0.026 to 0.052 | 1.04 to 2.08 | 7.03 to 14.06 | 0.5 to 1 |
| Dehydrated and ground kelp [4] | 0.036 | 0.185 | 0.005 | 0.003 | | 0.037 | 0.001 |
| Salt | | 19 | | | | | |
| Oyster shell flour | | 47.5 | 18.985 to 19.5 | 0.285 | | | |
| Fine charcoal | 5 | | | | | | |
| Potassium iodide | | | | | | | |
| Anise oil | | | | | | | |
| Manganese | | | | | | | |
| Copperas | | | | | | | |
| Sulphate of iron | | | | | | | |
| "Crystal" Mineral oil | | | | | | | |

[1] Contains Flavin and Filtrate Factor, carbohydrates as Lactos when present and percentages are estimated.
[2] Product marketed by Korinek Laboratories—contains .04% iodine.
[3] Concentrated product marketed by National Oil Products Company.
[4] No salt added when Kelp is used.

If this feed is mixed by hand, the "sunshine" minerals and shell flour are placed in a conical pile on the floor. The apex is dented in enough to hold the anise, cod liver and mineral oils. The potassium iodide is measured and mixed with an equal amount of water in a cup and added to the pool of oil. The mixture is then stirred and it will soon emulsify. The other minerals, salt, manganese, copperas and sulphate of iron, are then gradually mixed to provide a mixture to be added to the grain, etc.

If the balance of the feed is mixed by hand, it has been found desirable to spread the mineral mix over a ten foot space, empty each sack of grain upon the other and then, with a scoop shovel commence mixing, piling each shovelful on the other into one corner until it is a sliding pile. This sliding helps to thoroughly mix the minerals and oils with the grain. It can be shoveled from one corner to the other until completely mixed.

When the ingredients are mixed at the mill, the oils and iodine dissolved in water, maganese, copperas and sulphate of iron are mixed to form an emulsion and are placed in a tank on the side of the mixer. This emulsion is gradually added to the bulk of the feed during the operation of the mixer. The "sunshine" minerals, shell flour and salt are put in the mixer with the feed.

It should also be pointed out that as the chemical characteristics of these ingredients vary in different localities and as various groups of chickens and various types of chickens react differently the utmost benefits from this feed formula can be obtained by varying the ingredients within the limits suggested herein and test to determine the effect upon the chickens themselves and the egg production.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the meaning and range of equivalency of the claim are therefore intended to be embraced therein.

| Ingredient | Baby Chick | Commercial Egg | Breeders |
|---|---|---|---|
| | Pounds | Pounds | Pounds |
| Ground Wheat | 200 | 400 | 400 |
| Ground Corn | 650 | 400 | 400 |
| Ground Oats | | 200 | 200 |
| Ground Oat Groat | 200 | | |
| Millrun | 320 | 400 | 400 |
| Dehydrated Alfalfa | 200 | 100 | 100 |
| Meat and Bone Meal | 100 | 200 | 120 |
| Herring Meal | 100 | 175 | 120 |
| Dried Whey (Lacto G) | 100 | | 120 |
| "Sunshine" Minerals (0.04% iodine) | 50 | 50 | 50 |
| Nopco Brand Cod Liver Oil | 10 | 2.5 | 5 |
| Yeast | 20 | 10 | 10 |
| Dehydrated and Ground Kelp (0.0015% iodine) | 50 | | |
| Salt | | 20 | 20 |
| Oyster Shell Flour | | 50 | 50 |
| Fine Charcoal | | | 5 |
| Potassium Iodide | 0.125 | 0.093 | 0.093 |
| Anise Oil | 0.125 | 0.093 | 0.093 |
| Manganese | 0.375 | 0.375 | 0.375 |
| Copperas | 0.031 | 0.031 | 0.031 |
| Sulphate of Iron | 2.5 | 2 | 2 |
| "Crystal" Mineral Oil | 8.77 | 8.77 | 8.77 |
| Total | 2,011.926+ | 2,018.862+ | 2,011.362+ |

What is claimed and desired to be secured by United States Letters Patent is:

A poultry feed mixture containing mash material and calcium and prosphorus, and including potassium iodide in the amount of 0.093 to 0.125 pound per ton of the mixture, said potassium iodide serving to stabilize assimilation of calcium and phosphorus in the ratio of approximately two parts of calcium to one part of phosphorus.

WALTER BAKER.

REFERENCES CITED

The following references are of record in the file of this patent:

UNITED STATES PATENTS

| Number | Name | Date |
|---|---|---|
| 826,990 | Cartwright | July 24, 1906 |
| 1,056,603 | Stiefel | Mar. 18, 1913 |
| 1,645,703 | Lapp | Oct. 18, 1927 |
| 1,992,673 | Morrman | Feb. 26, 1935 |
| 2,098,998 | Brinton | Nov. 16, 1937 |
| 2,152,438 | McHan | Mar. 28, 1939 |
| 2,179,917 | Brinton | Nov. 14, 1939 |
| 2,382,193 | Whitmoyer et al. | Aug. 14, 1945 |

FOREIGN PATENTS

| Number | Country | Date |
|---|---|---|
| 280,774 | Great Britain | of 1927 |

OTHER REFERENCES

Battery Brooding, M. H. Arndt-Orange, Judd Pub. Co., 1931, page 246.